Figure 1:
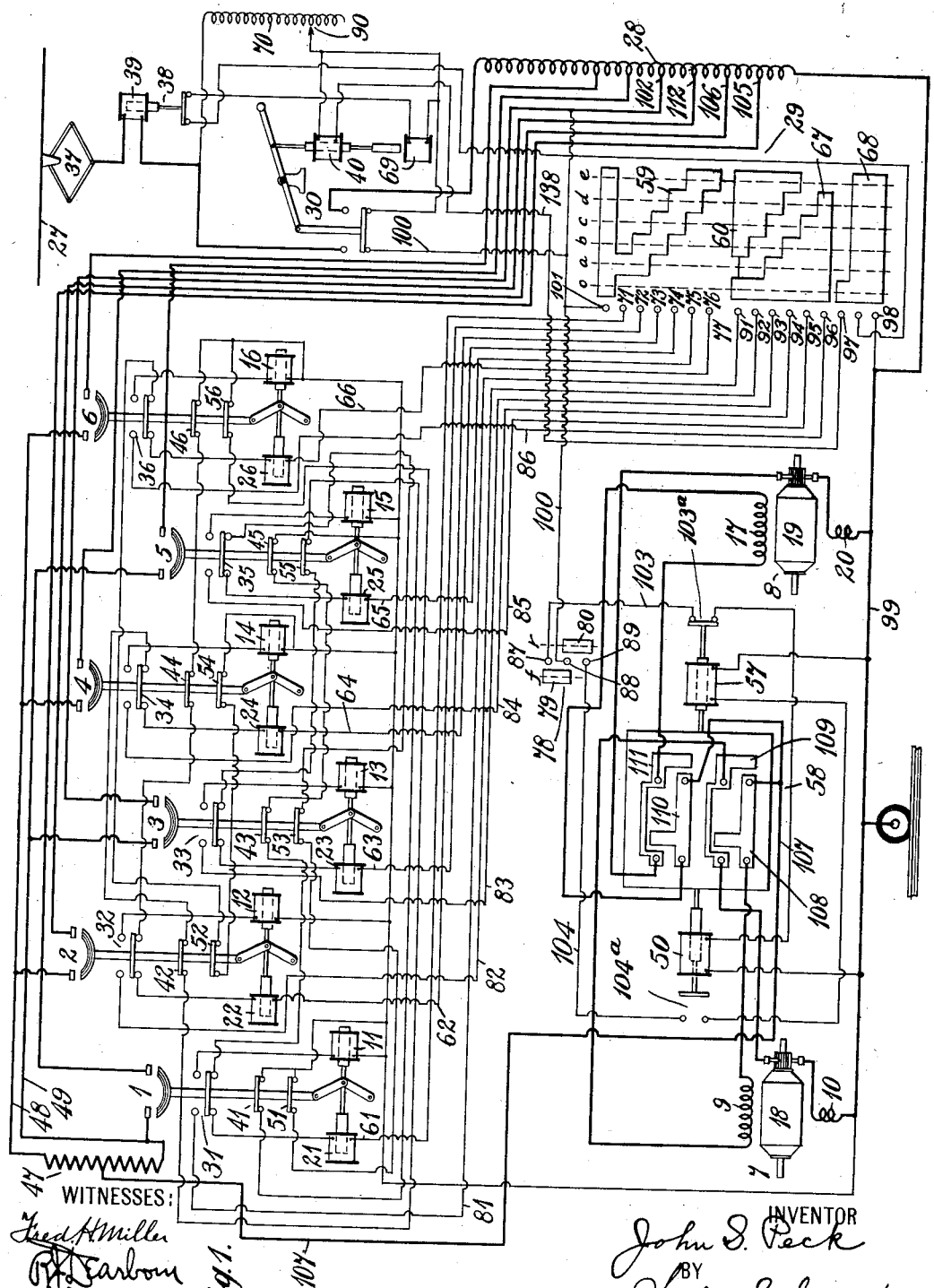

J. S. PECK.
CONTROL SYSTEM FOR ELECTRIC MOTORS.
APPLICATION FILED FEB. 11, 1910.

1,083,941.

Patented Jan. 13, 1914.

2 SHEETS—SHEET 1.

WITNESSES:
Fred H. Miller
R. J. Dearborn

INVENTOR
John S. Peck
BY
Wesley G. Carr
ATTORNEY

J. S. PECK.
CONTROL SYSTEM FOR ELECTRIC MOTORS.
APPLICATION FILED FEB. 11, 1910.

1,083,941.

Patented Jan. 13, 1914.

2 SHEETS—SHEET 2.

WITNESSES:

INVENTOR

ATTORNEY

UNITED STATES PATENT OFFICE.

JOHN SEDGWICK PECK, OF MANCHESTER, ENGLAND, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,083,941.  Specification of Letters Patent.  Patented Jan. 13, 1914.

Application filed February 11, 1910. Serial No. 543,374.

*To all whom it may concern:*

Be it known that I, JOHN SEDGWICK PECK, a citizen of the United States, and a resident of Manchester, in the county of Lancaster, England, have invented a new and useful Improvement in Control Systems for Electric Motors, of which the following is a specification.

My invention relates to control systems for electric motors and more particularly to those systems in which the various connections and disconnections of the system, or some of them, are effected by individual electro-magnetically operated switches. Hitherto, in control systems of this kind, the electro-magnetically operated switches have been provided with one or more actuating magnet coils for closing them against the action of gravity or springs, which, when the coils are deënergized, tend to return them to their open positions, so that, while the switches are in their closed positions, the actuating magnet coils are continuously traversed by current. Such an arrangement is defective because the actuating magnets of the electro-magnetically operated switches must necessarily be of sufficient capacity to carry their energizing currents for considerable periods of time without an undue rise of temperature, and, even if the magnets are thus designed, continuous copper losses are incurred during the time the switches are closed and current is traversing the coils. Furthermore, when alternating currents are employed, iron losses in the magnet cores occur and a humming or vibration of the said cores is caused, which, especially on circuits of the low frequency, which are usually adopted for power and traction purposes, is objectionable. Difficulty is also experienced in maintaining good contact between the parts of the switch, on account of the vibration or chattering.

My present invention has for its object to provide a control system of the character indicated in which the above and other disadvantages are obviated, and which is simple and cheap to construct and is reliable and satisfactory in operation.

According to the present invention, the electro-magnetically operated switches which are employed are of such a nature that, after a switch has been closed, the mechanism for connecting the moving part of the actuating electro-magnet with the movable member of the switch will maintain the switch in its closed position without requiring the continuous excitation of the coil of the said actuating magnet.

Since switches of the above type are necessarily provided with both opening and closing coils and, when once moved to their closed position, can only be opened by energizing their opening coils, it is clear that a failure of the main current supply will not result in opening such switches as are closed, in those cases in which the coils are energized from the main circuit.

A subsequent reëstablishment of the main supply of current might thus cause full voltage to be impressed upon the motors if some of the switches were left in their closed positions. In order to avoid this, a no-voltage circuit breaker is connected between the source of supply and the motor circuit, the circuit breaker being so constructed that its re-setting coil can only be energized when the master controller which governs the operation of the switches is in its "off" position. The opening of this circuit breaker is arranged to close a circuit through the opening coils of all the switches which are in their closed positions, so that, as soon as the main supply of current is reëstablished after a failure, all the switches which are closed will be opened before the circuit breaker is again closed.

Figure 2:
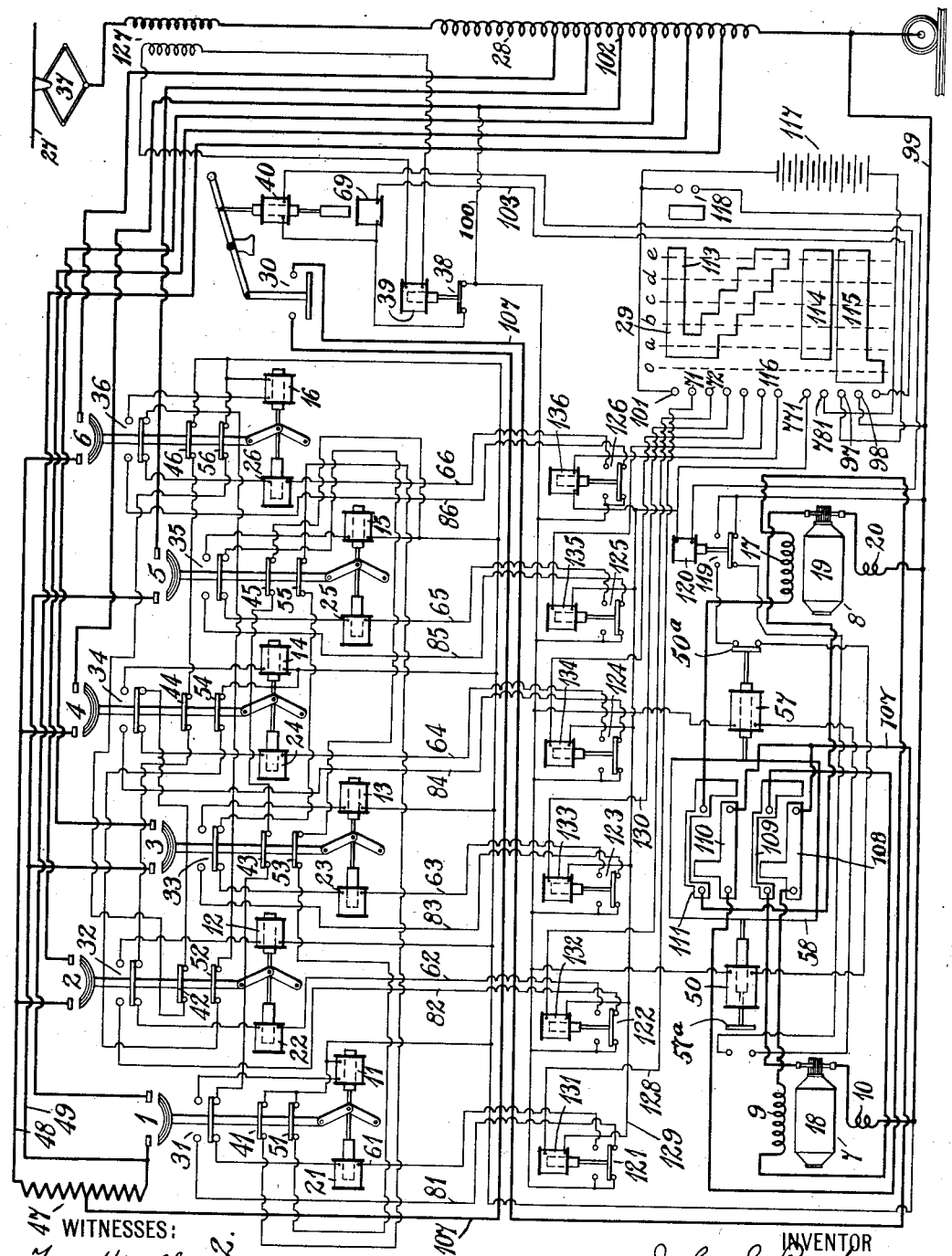

In the accompanying drawings, Figure 1 is a diagram illustrating an alternating current control system embodying my invention and Fig. 2 is a diagram illustrating a modification.

Referring now to Fig. 1, two single-phase commutator motors 7 and 8 are shown as supplied with alternating current energy from a supply conductor 27, through a main auto-transformer 28 having a plurality of leads four of which are designated as 102, 105, 106 and 112. The motors 7 and 8 respectively comprise armatures 18 and 19, field magnet windings 9 and 17 and compensating windings 10 and 20. Electro-magnetically operated switches 1, 2, 3, 4, 5 and 6 are provided for connecting the motors 7 and 8 to the leads of successively increasing voltage of the auto-transformer 28, the switches 1, 2, 3, etc. being preferably of the well-known toggle type of construction, and each being provided with opening coils 11, 12, 13, 14, 15 and 16 and with closing coils 21, 22, 23, 24, 25 and 26, respectively.

The switches 1, 2, 3, etc. are also respectively provided with three interlocking switches 31, 41, 51; 32, 42, 52; 33, 43, 53, etc. for the purpose of insuring the operation of the switches in the proper order, as hereinafter explained. Two of the switches are always closed at the same time during the operation of the apparatus in order that two adjacent leads of the auto-transformer 28 may be connected to two conductors 48, 49 which are connected to the terminals of a preventive resistance 47, the middle point of which is connected to the motor circuit.

A reversing switch 58, which may be of any well-known type, is also provided for reversing the direction of rotation of the motors, when desired, the reversing switch being electro-magnetically moved to the one or the other of its extreme positions by means of electro-magnets 50 and 57. The supply of energy to the opening and closing coils 11, 21; 12, 22, etc. of the switches 1, 2, etc., is controlled by means of a master controller 29, which may be of any preferred construction. The circuit of the main auto-transformer 28 includes a circuit breaker 30 and the electro-magnet coil 39 of a limit switch 38, the transformer 28 being connected to the supply conductor 27 by means of a current collector 37. The circuit breaker 30 is provided with a "hold-on" coil 69 and a re-setting coil 40 which are energized from an intermediate point 90 of an auxiliary auto-transformer 70, the point 90 being also connected to a conductor 100 when the circuit breaker 30 is in its open position. The master controller 29 is provided with contact segments 59, 60, 67, and 68, which are mounted upon a drum and are adapted to be engaged by contact fingers 77. A reverser controller 78 is also provided having contact segments 79 and 80 which are adapted to be engaged by contact fingers 87 and 88 or 88 and 89. The reverser controller 78 may be moved into either of two positions which are indicated by the dotted lines $f$ and $r$, and the master controller 29 may be moved from its "off" position which is indicated by dotted line $o$, to occupy any one of a series of positions which are indicated by the dotted lines $a\ b\ c\ d\ e$.

The operation of the system is as follows:—When the master controller 29 is in its "off" position, a circuit is completed from the intermediate points 90 in the auxiliary transformer winding 70 through the resetting coil 40 of the circuit breaker 30, conductor 138, contact finger 97 of the master controller 29, contact 68, and contact finger 98, to the grounded conductor 99. The resetting coil 40, being thus energized, closes the circuit breaker 30 and thereby connects the main auto-transformer 28 to the supply conductor 27. The reverser controller 78 is now moved from its intermediate off position into either its forward position $f$ or its reverse position $r$ so as to complete a circuit from the intermediate lead 102 of the main transformer 28 through the conductor 100, contact finger 88 of the reverser controller 78, contact segment 79 or contact segment 80, conductor 103 or 104 and auxiliary switch 103$^a$ or 104$^a$, according as the reverser controller 78 is in the position $f$ or in the position $r$, thereby causing either the electromagnet 50 or the electro-magnet 57 to be energized to insure that the reversing switch 58 occupies a corresponding position for the desired direction of rotation. The reversing switch is only adapted to occupy two positions corresponding respectively to a forward and a reverse rotation of the motors and consequently it will only be adjusted when a change in direction is desired. The master controller 29 is now moved from its "off" position to position $a$, thereby completing a circuit from the conductor 100, through contact finger 101, contact finger 71, conductor 61, closing coil 21 of the switch 1, interlocking switch 31, interlocking switch 43 of the switch 3 and interlocking switch 45 of the switch 5, to the grounded conductor 99. A parallel circuit is also completed from the contact segment 59 through the contact finger 72, conductor 62, closing coil 22 of the switch 2, interlocking switch 32, interlocking switch 44 of the switch 4 and interlocking switch 46 of the switch 6 to the grounded conductor 99. The closing coils 21 and 22 of the switches 1 and 2 being thus energized, the switches 1 and 2 are closed and the conductors 48 and 49 are thereby connected respectively to the leads 105 and 106 of the main transformer 28, the leads 105 and 106 being thus connected to the ends of the preventive resistance 47, so that a voltage intermediate the voltage of these leads is impressed upon the conductor 107.

With the reversing switch in the position shown in the figure, to which it has been set by the energizing of the electro-magnet 57, a circuit is completed from the conductor 107 through reverser contact 108, field magnet winding 9, reverser contact 109, armature 18 and compensating winding 10 to the ground conductor 99; a parallel circuit from the conductor 107 being also established through the reverser contact 110, field magnet winding 17, reverser contact 111, armature 19, and compensating winding 20 to the ground conductor 99. A voltage intermediate that of the leads 105 and 106 of the auto-transformer 28 is thereby impressed upon the windings of the motors 7 and 8 which are thus caused to operate at a corresponding speed. If the master controller 29 is now moved to its *b* position, the circuit of the closing coil 21 of the switch 1, through the contact finger 71 is broken, and a circuit is simultaneously completed from the contact 59 through the contact segment 60, contact finger 91, conductor 81, the upper contacts of interlocking switch 31 (which are connected, in the closed position of the switch 1) and the opening coil 11 of the switch 1 to the ground conductor 99, the switch 1 being thus caused to move to its open position. A circuit is also completed from the contact segment 59 through the contact finger 73, conductor 63, the closing coil 23 of the switch 3, the lower contacts of the interlocking switch 33, interlocking switch 55, and interlocking switch 41 to the ground conductor 99, thus energizing the closing coil 23 so as to close the switch 3. The switches 2 and 3 now being in their closed positions, the conductor 49 is connected to the lead 112 of the auto-transformer 28, so that the voltage impressed upon the conductor 107 leading to the motor circuit is intermediate the voltages of the leads 106 and 112, whereby a corresponding higher speed of the motors is obtained. Further movement of the master controller 29 to the positions *c*, *d*, *e*, causes the conductors 48 and 49 to be alternately connected to the next successive lead of higher voltage of the auto-transformer 28, as will be readily understood from the figure. The overload switch 38 serves to break the circuit through the "hold-on" coil 69 of the switch 30 in the case of an abnormal current traversing the auto-transformer, so as to cause the circuit breaker 30 to open the transformer circuit.

The resetting coil 40 of the circuit breaker, being connected through the conductor 138 to the contact finger 97 of the master controller, can evidently only be energized in the "off" position of the master controller and, in moving the master controller 29 to its "off" position, in order to resume the operation of the motors, the opening coils of any of the switches which are closed will be energized from the auxiliary transformer 70, so as to insure all the switches being in their open positions, before the master controller is again moved from its "off" position. The circuit breaker 30 will also evidently be opened if the line voltage fails for any reason, since, in this case also, the "hold-on" coil 69 will be deënergized. If, for instance, the line voltage fails, or an overload occurs on the circuit when the master controller is in its *b* position, the switches 2 and 3 being closed, the circuit breaker 30 will be opened and will complete a circuit from the intermediate lead 90 of the auxiliary transformer 70 through conductor 100, contact finger 101 to the contact segment 59. If the master controller is now moved back to its *a* position, a circuit is completed from the contact segment 59 through contact segments 60 and 67, contact finger 93, conductor 83, the upper contacts of the interlocking switch 33 and opening coil 13 to the ground conductor 99, thus causing the switch 3 to open. Further movement of the controller back to its "off" position will similarly cause the opening coil 12 of the switch 2 to be energized, so as to cause this switch also to open when the controller has reached its "off" position.

If desired, the circuits of the opening and closing coils of the individual switches 1, 2, 3 etc. of the system may be provided with relay switches to be electromagnetically operated by current from a battery or other suitable source and controlled by means of the master controller.

In Fig. 2 I have illustrated a modification of the above mentioned character in which relay switches 121, 122, 123, 124, 125 and 126 are provided for opening and closing the circuits of the opening and closing coils of the switches 1, 2, 3, 4, 5 and 6, respectively. The construction of the relay switches 121, 122, etc. is such that their movable members are normally maintained, by the action of gravity or by springs, in such positions as to connect the lower contacts of the relays, and are arranged to be moved, by means of actuating coils 131, 132, 133, etc., into such positions as to connect the upper contacts of the relays.

The supply of current to the coils 131, 132, 133, etc. is controlled by means of the master controller 29 which is provided with contact segments 113, 114 and 115 and contact fingers 116 engaging therewith, the master controller being capable of being moved from its "off" position to the positions indicated by the dotted lines *a*, *b*, *c*, *d*, *e*, in a similar manner to that already described with reference to the controller of Fig. 1.

The energy for operating the relay coils 131, 132, 133 etc. is obtained from a battery 117, and the reversing controller, in this case, takes the form of a simple switch 118. The circuit breaker 30 in this case is shown and connected in the conductor 107 leading from the preventive resistance 47 to the motor circuit. The circuits leading to the actuating electro-magnets 50 and 57 of the reversing switch are also arranged to be controlled by a relay 119 similar to the relays 121, 122, etc. and provided with an actuating coil 120. The limit switch 38 in this case is indicated as supplied with current from the secondary winding of the series transformer 127, the primary winding of which is connected in the circuit of the auto-transformer 28.

The operation of the system is as follows: When the master controller 29 is in its "off" position, the relay 119 being in the position indicated in the figure corresponding to one direction of rotation, a circuit is completed from the intermediate lead 102 of the auto-transformer 28 through the conductor 100, the contacts of the limit switch 38, the hold-on coil 69 of the circuit-breaker 30, conductor 103, contact finger 97, contact 115 of the master controller 29 and contact finger 98 to the ground conductor 99, thereby closing the circuit breaker 30. If the master controller is moved to the position $a$, a circuit will be completed from the positive terminal of the battery 117 through the contact finger 101, contact segment 113, contact finger 71, conductor 128, actuating coil 131 of relay 121, conductor 129, contact finger 771, contact 114 and contact finger 781 to the negative terminal of the battery 117. The coil 131 being thus energized the relay 121 is moved to its upper position and completes a circuit through conductor 61 to the conductor 100, thereby energizing the closing coil 21 of the switch 1 in the manner already described with reference to Fig. 1. A circuit from the contact 113 of the master controller 29 is simultaneously completed through the contact finger 72, conductor 130 and relay coil 132 of the relay 122, thereby causing the closing coil 22 of the switch 2 to become energized and effect the closing of the switch 2 in a similar manner. Further movement of the master controller 29 to the positions $b$, $c$, $d$, $e$ etc. effects, by means of the appropriate relays, the successive closing, in pairs, of the switches 1, 2, 3, 4, 5 and 6, as already described with reference to Fig. 1.

If the master controller 29 is returned to its "off" position from any of the positions $a$, $b$, $c$, $d$ and $e$, such of the individual switches 1, 2, 3, etc., which were previously in their closed positions, are automatically opened by means of the relays 121, 122, 123, etc. If, for instance, the master controller is in the position $c$, in which the switches 3 and 4 are closed, the corresponding relays 123 and 124 being in their upper positions, the return of the master controller 29 to the "off" position will break the circuits of the energizing coils 133 and 134 of the above mentioned relays, which will, consequently, resume their lower positions. A circuit will thus be completed from the conductor 100 through the lower contacts of the relay 123, the upper contacts of interlocking switch 33, and the opening coil 13 of the switch 3 to the ground conductor 99, a parallel circuit being similarly completed through the opening coil 14 of the switch 4, and, the opening coils 13 and 14 being thus energized, the switches 3 and 4 will be opened.

It will be seen that, in Fig. 2, the circuit breaker 30 is connected to the low-voltage side of the system, the auto-transformer 28 being permanently connected to the current collector 37, so that, so long as the voltage of the supply conductor 27 is maintained, the lower voltage of the intermediate lead 102 is available for operating the hold-on coil 69 and the re-setting coil 40 of the circuit breaker. The circuit breaker may, however, if desired, be placed on the high tension side of the system, as illustrated in Fig. 1, in which case the auxiliary transformer already referred to will be unnecessary.

If it be desired to reverse the direction of rotation of the motors in the system of Fig. 2, the reverse switch 118 is closed, thereby completing a circuit from the battery 117 through the relay coil 120 of the relay 119, whereupon the movement of the said relay completes a circuit from transformer tap 102 through conductor 100, coil 50 of the reverser, auxiliary switch $50^a$, operatively connected to the movable member of the reverser and relay switch 119 to ground conductor 99. The position of the reverser is thus changed, the direction of current in the field magnet windings 9 and 17 being reversed in the usual manner. The switch $50^a$ is opened as the reverser changes its position and a corresponding switch $57^a$ is closed so that the position of the reverser may be again changed when the coil 120 of the relay switch 119 is deënergized.

It will be observed that the interlocking switches 21, 41, 51, 22, 42, 52 etc. are indicated as mechanically operated by the switches 1, 2, etc., as in Fig. 1, but these interlocking switches may evidently be operated by the relay switches 121, 122, 123 etc., if desired.

It will be understood that, in alternating current systems, the opening and closing coils of the individual switches may be supplied with current either from a low voltage point of the main transformer or from an auxiliary transformer, and, in direct current systems, these coils may be supplied either directly from the supply circuit or indirectly through one or more auxiliary devices.

The invention is obviously capable of various modifications, as regards the manner of carrying out the same, and is not limited to the arrangements described herein which have been set forth for the purpose of illustration.

I claim as my invention:

1. In a control system, the combination with main switches severally provided with opening and closing coils, of a master controller for supplying current from the main circuit to said coils, and a circuit breaker which connects the master controller to a source of supply that is independent of the circuit breaker when it breaks the main circuit, so that the opening coils of all the switches which are in their closed positions will be energized during the movement of the controller to its "off" position, for the purpose specified.

2. In a motor-control system, the combination with main switches having opening and closing coils, relays and a master controller for governing the circuits of said coils, and interlocking switches interposed between the supply circuit and the opening coils of the main switches and connected thereto by said relays when the latter are in their deënergized positions.

3. In a control system for electric motors, the combination with a plurality of unbiased independently operated switches and auxiliary switches operatively connected thereto, of independent electro-responsive means for respectively opening and closing each of the switches and relay switches which when deënergized, effect, the opening of the unbiased switches.

4. In a control system for electric motors, the combination with a plurality of unbiased independently operated switches adapted to close in a predetermined sequence, of independent electro-responsive means for respectively opening and closing each of the switches and relay switches so biased as to energize the electro-responsive means for opening the unbiased switches.

5. The combination with a plurality of unbiased switches adapted to close in a predetermined sequence, of independent means for respectively opening and closing each switch and biased switches for energizing the closing means, when released.

6. The combination with a plurality of unbiased switches adapted to close in a predetermined sequence, of independent means for respectively opening and closing each switch, means for preventing the concurrent action of said opening and closing means and biased relay switches for opening the unbiased switches.

7. The combination with a plurality of switches adapted to close in a predetermined sequence and a circuit interrupter, of electro-responsive means for respectively opening and closing each switch, auxiliary switches operatively connected to the first named switches for precluding the concurrent action of the opening and closing means and means for opening the unbiased switches when the circuit interrupter is opened.

8. The combination with a plurality of switches adapted to close in a predetermined sequence and a circuit interrupter, of electro-responsive means for respectively opening and closing each switch, auxiliary switches operatively connected to the first named switches for deënergizing the closing means when the switch is closed and deënergizing the opening means when the switch is open and electro-responsive means for opening the unbiased switches when the circuit interrupter is open.

9. The combination with a plurality of switches adapted to close in a predetermined sequence, and independent opening and closing electro-magnets for each switch, of means associated with each switch for interrupting the circuit of the closing magnet when the switch occupies its closed position, and for interrupting the circuit of the opening magnet when the switch occupies its open position and relay switches adapted, when open, to energize the opening electro-magnets of the unbiased switches.

10. In a control system for electric motors, the combination with a plurality of independently operated switches adapted to close in a predetermined sequence and independent opening and closing magnets for each switch, of a master controller and interposed relay switches for electrically separating the master controller from the independently operated switches.

11. In a control system for electric motors, the combination with a plurality of unbiased independently operated switches adapted to close in a predetermined sequence, and independent electro-responsive means comprising biased switches for respectively opening and closing each of the unbiased switches, of a master controller for governing the supply of energy to the electro-responsive means, and adapted to successively energize the electro-responsive opening means of the several switches as it is adjusted toward its off position.

In testimony whereof, I have hereunto subscribed my name this 26th day of January, 1910.

JOHN SEDGWICK PECK.

Witnesses:
    Jas. Stewart Broadfoot,
    H. R. Kitson.

---

Copies of this patent may be obtained for five cents each, by addressing the "Commissioner of Patents, Washington, D. C."